United States Patent
Lebovitz et al.

(10) Patent No.: US 6,384,841 B1
(45) Date of Patent: May 7, 2002

(54) INTELLIGENT SELECTION OF GRAPHIC OBJECTS KEYPOINTS AND RELATIONSHIPS

(75) Inventors: Paul Lebovitz, Huntsville; Gary Smith, Madison; Mark Russell, Decator; Eric Mawby, Madison, all of AL (US)

(73) Assignee: Intergraph Corporation, Huntsville, AL (US)

( * ) Notice: Subject to any disclaimer, the term of this patent is extended or adjusted under 35 U.S.C. 154(b) by 0 days.

(21) Appl. No.: 09/353,534

(22) Filed: Jul. 14, 1999

Related U.S. Application Data

(63) Continuation of application No. 08/974,930, filed on Nov. 20, 1997, now Pat. No. 6,124,861, which is a continuation of application No. 08/435,647, filed on May 5, 1995, now abandoned.

(51) Int. Cl.[7] .................................................. G09G 5/00
(52) U.S. Cl. ......................................................... 345/642
(58) Field of Search ................................ 345/642, 767, 345/852

(56) References Cited

U.S. PATENT DOCUMENTS 6,124,861 A * 9/2000 Lebovitz et al.

FOREIGN PATENT DOCUMENTS

| EP | 0318154 A3 | 5/1989 |
|----|------------|--------|
| EP | 0480570 A3 | 4/1992 |
| EP | 0550838 A1 | 7/1993 |
| EP | 0738952 A2 | 10/1996 |

* cited by examiner

*Primary Examiner*—Almis R. Jankus
(74) *Attorney, Agent, or Firm*—Townsend&Townsend&Crew LLP

(57) ABSTRACT

The present invention provides a computer system with an improved graphically-oriented user interface that permits the user to more easily select for manipulation one object from a number of objects that overlap or are in close proximity to one another at a common location in a graphic display. In a preferred embodiment, the invention presents the computer user with the opportunity to preview all possible objects that the cursor might be identifying at its current position and the ability to select one of those objects for manipulation. Thus, rather than cycling through the entire list of objects available for selection at a location in the display, the user can immediately narrow the list down to the desired selection only. The present invention prevents selection errors and drastically reduces the number of user inputs required to select an object.

20 Claims, 9 Drawing Sheets

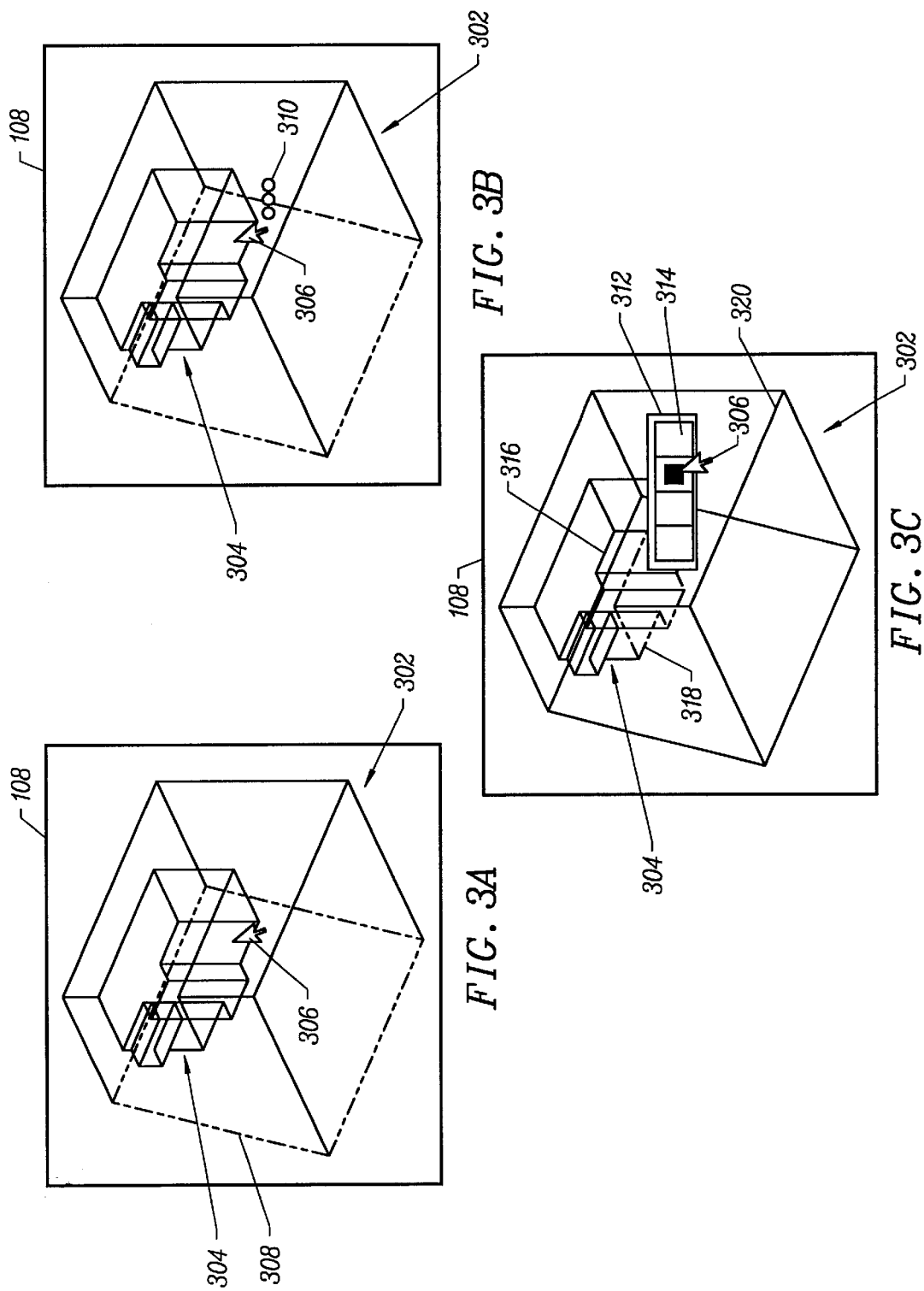

INTELLIGENT SELECTION OF GRAPHIC OBJECTS KEYPOINTS AND RELATIONSHIPS

This application is a continuation of and claims the benefit of U.S. application Ser. No. 08/974,930, filed Nov. 20, 1997, now U.S. Pat No. 6,124,861; which is a continuation of U.S. application Ser. No. 08/435,647 filed May 5, 1995, now abandoned, the disclosures of which are incorporated by reference.

BACKGROUND OF THE INVENTION

The present invention relates to a computer system having a graphically-oriented user interface. More particularly, the invention relates to a system and method for selecting one of a plurality of overlapping or intersecting graphic images at a location on the graphic display of the computer system.

Computer systems are known in which the user interacts with the system through a graphically-oriented interface. The user can run application programs, manipulate files and perform many other functions by manipulating graphic images on the computer's graphic display. User control may be achieved by cursor control keys on the computer keyboard, a cursor controlling peripheral device, such as a mouse, joystick or track ball, or other control input devices, such as in a pen-based or voice-based system. The graphic images can represent a number of elements in a computer program. For example, programs and data can be shown as "windows" or icons on the display, where each window or icon represents a different application program or data file. Within a particular application program, such as a computer-aided design (CAD) or drawing program, elements are depicted on the graphic display as different figures or icons. For example, in a CAD logic design package, an AND function is identified by the common symbol for an AND gate, and the interconnections among gates are shown as lines or wires. A drawing package can contain representations of common objects such as a line, a two-dimensional box or a three-dimensional cube.

The process of selecting a particular object for manipulation within a graphically-oriented user interface environment can present a problem if several objects are located in the area to which the cursor points. For example, a number of objects might intersect or overlap at a common location in a two-dimensional graphic display, making it unclear which of the objects the cursor is referencing. The user cannot be certain which object is being selected if the user indicates through the cursor-controlling device that an object is to be selected. So, for example, if a mouse is used for cursor control, and the user clicks on a mouse button to select one of the overlapping images, the incorrect object may be selected, since the cursor referenced an image other than the one desired by the user. In a three-dimensional environment, if the cursor is positioned on one surface of a cube, for example, it is not clear if the cursor is pointing to the front surface or the rear surface, which lies underneath the cube's front surface in the graphic display. The problem is further complicated if another object is contained within the cube, since it is then unclear if the cursor is pointing to the cube's front surface or rear surface, or any of the surfaces of the object inside the cube.

Current computer systems address the above problem by allowing the user to reject an object that has been selected by default by the cursor in favor of the one desired by the user. For example, using the simple example of a drawing program including a cube in three-dimensional space on a graphic display, the user may seek to select the rear surface of the cube for the purpose of manipulating that surface only. The user may wish to move the selected surface or change its size, for example. If the cursor is in a position where it could be pointing to either the front or rear surface of the cube, the default selection made by the computer system might be the front surface of the cube. The system would confirm whether this default selection was the one actually desired by the user. The user would then have to reject the selection of the front surface, causing the computer system to present the rear surface as the selected object, which the user would accept. This selection process is already rather tedious if the cursor points to two or three objects at a location. Where a multi-surfaced object is located inside of a cube in three-dimensional space on the graphic display of a computer system, a current selection process would require the user to cycle through four or more possible objects before settling on the desired one. Even worse, if the user accidentally rejected the desired object while cycling through all of the possible objects to be selected, the user would have to repeat the entire cycle to return to the object or surface that was actually meant to be selected.

Thus, a computer system is desired which includes a graphically-oriented user interface that eliminates the tedious and error-prone nature of selecting one of a plurality of objects in a graphic display.

SUMMARY OF THE INVENTION

The present invention provides a computer system with an improved graphically-oriented user interface that permits the user to more easily select for manipulation one object from a number of objects that overlap or are in close proximity to one another at a common location in a graphic display.

In a preferred embodiment, the invention presents the computer user with the opportunity to preview all possible objects that the cursor might be pointing to at its current position and the ability to select one of those objects for manipulation. Thus, rather than cycling through the entire list of objects available for selection at a location in the display, the user can immediately narrow the list down to the desired selection only. The preferred embodiment may be implemented in either a two-dimensional or a three-dimensional graphic display environment to select among several graphic objects, keypoints or relationships. The present invention prevents selection errors and drastically reduces the number of user inputs required to select an object.

A further understanding of the nature and advantages of the inventions herein may be realized by reference to the remaining portions of the specification and the attached drawings.

BRIEF DESCRIPTION OF THE DRAWINGS

FIGS. 3A–3C illustrate the selection of a desired object on a graphic display.

DESCRIPTION OF THE PREFERRED EMBODIMENT

Figure 1A:
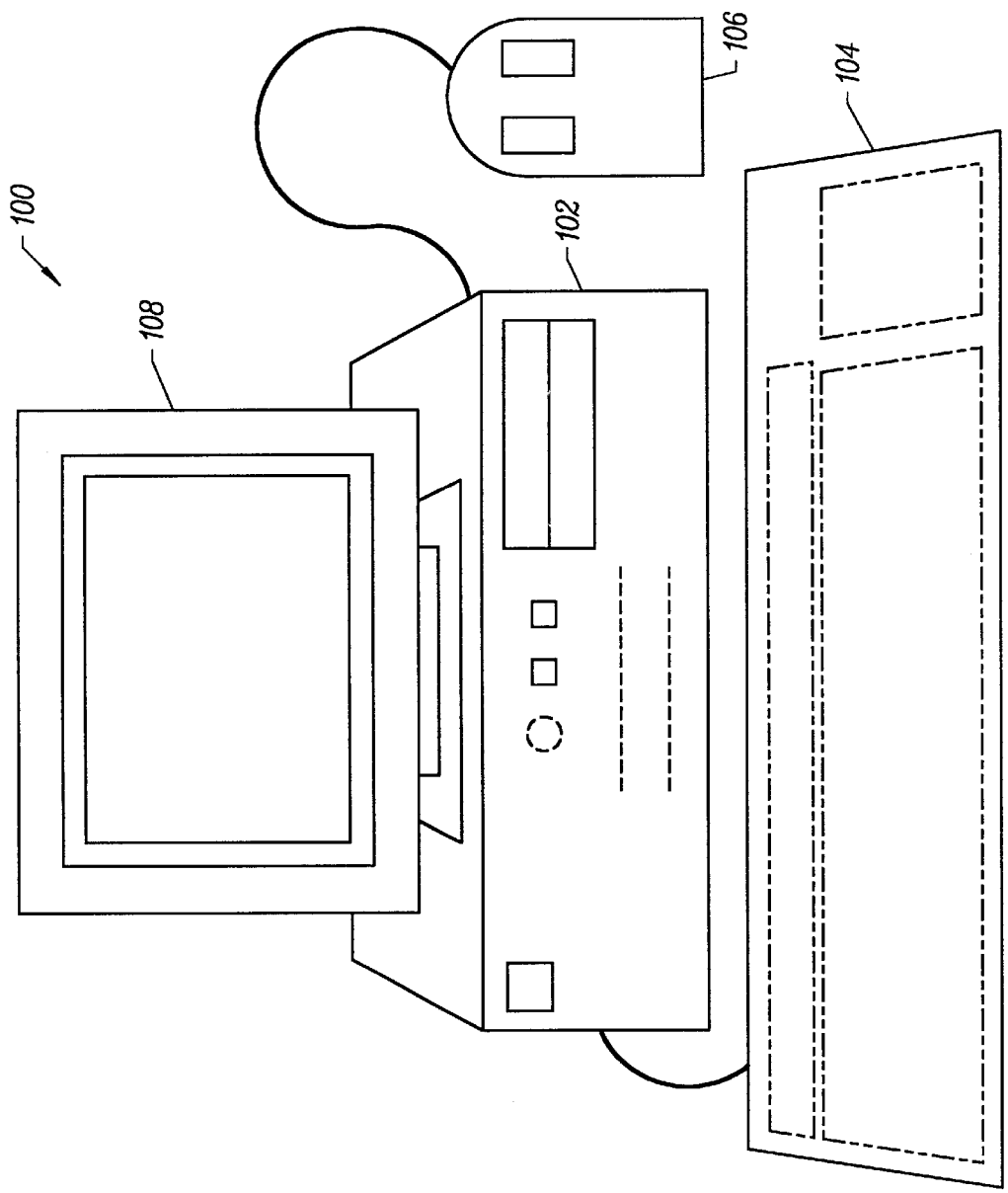
FIG. 1A is a block diagram of an exemplary hardware configuration for a computer system in which the present invention is implemented.

FIG. 1A shows a preferred computer system 100 in which the present invention is implemented. A processing unit 102 contains the control elements of the computer system 100. Keyboard 104 and mouse 106 are coupled to processing unit 102 and enable the system user to input commands and data to computer system 100. Display device 108 serves as the final element of the user interface, where the user can see the results of the inputs to keyboard 104 and mouse 106 and the effect of those inputs in the application program.

Figure 1B:
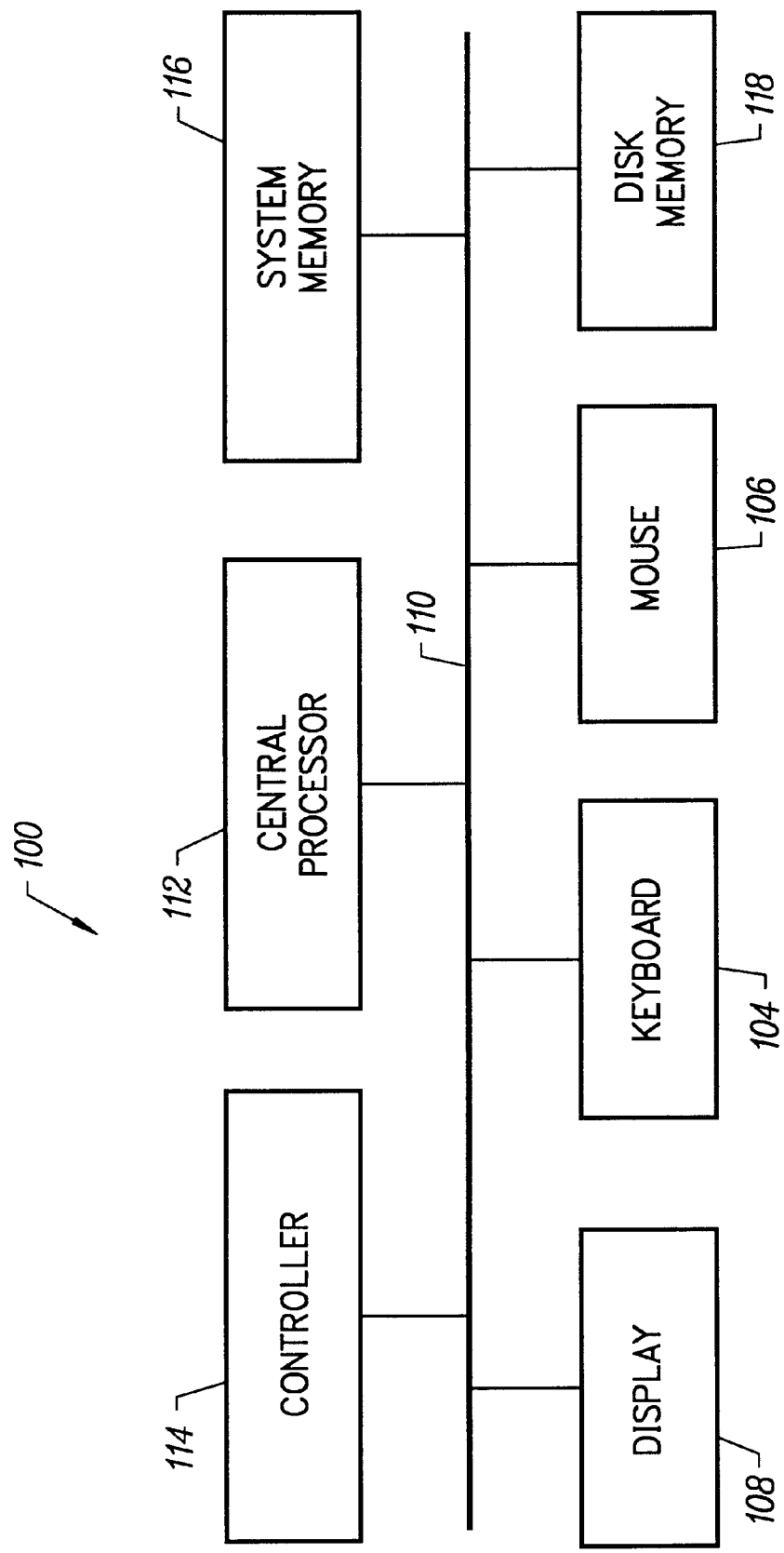
FIG. 1B is a system architecture block diagram of the computer system of FIG. 1A.

FIG. 1B shows a system architecture block diagram of the computer system of FIG. 1A. The system elements are interconnected by system bus 110. In addition to keyboard 104, mouse 106 and display 108, the control elements included in processing unit 102 are shown. Central processor (CPU) 112 and controller 114 control operation of computer system 100. Program and data information are stored in system memory 116 and disk memory 118. The user interface system of the present invention which allows the user to more easily select an object on display device 108 for manipulation is operably disposed in system memory 116 and disk memory 118.

Figure 2A:
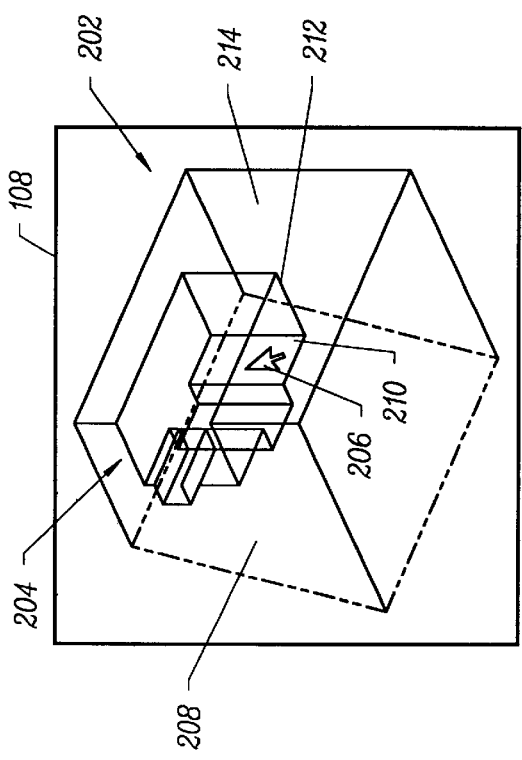
FIGS. 2A–2C show several exemplary views of a three-dimensional object on a graphic display screen which presents problems in selecting a desired face of the object.
Figure 2B:
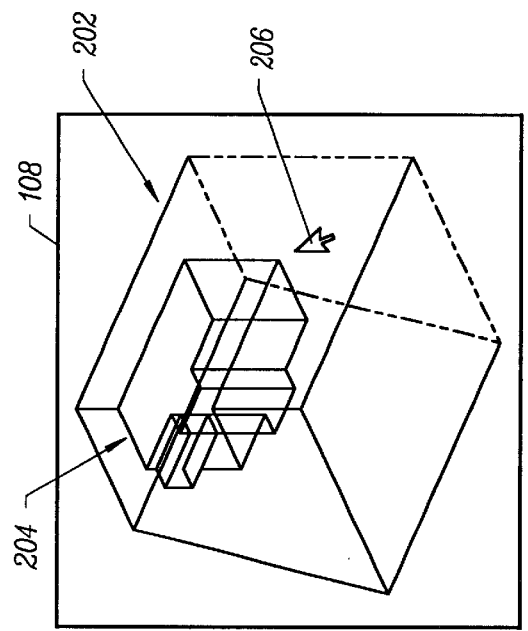
Figure 2C:
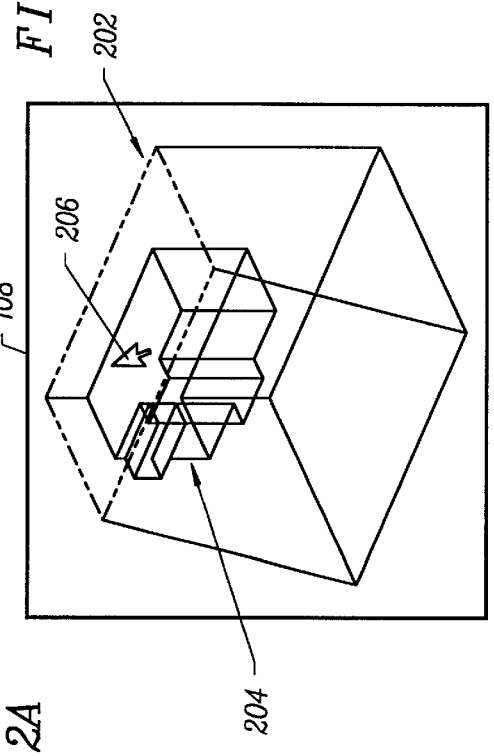

FIGS. 2A–2C show examples of a three-dimensional object 202 on graphic display screen 108 which present problems in selecting a desired object for manipulation. Another three-dimensional object 204 is shown contained within object 202, further complicating the selection process. The cursor 206 has the shape of an arrow on display screen 108, where the location referenced by cursor 206 is directly under the tip of the arrow. As shown in FIG. 2A, one of the objects or surfaces at the location of cursor 206 on display screen 108 is selected for manipulation by the user by default, which the computer system 100 identifies by highlighting that object. In FIG. 2A, the highlighted surface is front surface 208 of object 202. However, the user may have moved cursor 206 to the position shown because of a need to manipulate any one of the other surfaces that lie beneath the cursor. The user may have wanted to select front surface 210 of the inner three-dimensional object 204, bottom surface 212 of object 204 or the rear surface 214 of outer three-dimensional object 202.

However, computer system 100 currently does not present the user with the choice of all possible surfaces. Instead, as described above, the user must cycle through each of the possible surfaces highlighted by computer 100 until arriving at and selecting the desired one. If, for example, the user wishes to select the rear surface 214 of outer three-dimensional object 202 for manipulation, the user may have to reject the first highlighted surface 208, the second highlighted surface 210 and the third highlighted surface 212, before finally selecting the final highlighted surface 214. This process is tedious and error-prone, especially considering the possibility that the user might accidentally miss selecting a desired surface and be forced to cycle through the entire list again. As is evident from FIG. 2B and FIG. 2C, the user would incur the same problems regardless of where cursor 206 is placed. In a three-dimensional environment, where a surface or object is often positioned behind another surface or object in the graphic display of a computer system, the user will almost always have a number of possible selections wherever the cursor is placed on the display screen 108. The present invention speeds up the process of selecting one of a number of possible objects on the graphic display screen.

FIGS. 3A–3C illustrate the selection of a desired object on a graphic display. Similar to FIG. 2A, graphic display screen 108 displays an outer three-dimensional object 302 that also contains an inner three-dimensional object 304. The position of cursor 306 on the display screen 108 is again indicated by the tip of the arrow shape of cursor 306. If the user wishes to isolate and select a particular surface or object for manipulation, the user begins the selection process by moving cursor 306 using the cursor-controlling means provided with the computer system 100, such as mouse 106 (FIG. 1A), to a position above the desired object. Again, one of the objects at the location of cursor 306 on the display screen 108 is selected for user manipulation by default, which the computer system 100 identifies by highlighting that object. In FIG. 3A, the highlighted surface is front surface 308 of object 302. If the user wishes to select highlighted surface 308 for manipulation anyway, that selection can be communicated to the computer system 100 immediately. If the cursor-controlling means is mouse 106, for example, the user may click on the appropriate mouse button to select and isolate front surface 308 for manipulation. However, if the user does not wish to select the default surface, the tedious rejection process may be avoided.

If an object other than the default object is desired, the user stops cursor motion and pauses cursor 306 at the desired position, as shown in FIG. 3B. The system recognizes that a pause in cursor motion indicates the need to make a selection of an object other than the default selection might exist. If it happens that the pause in cursor motion does not indicate the need to make a selection of another object and that there is only one object that could be selected by the user at the current location of cursor 306, an input by the user to the system would automatically select that object. So, for example, if the user moved the mouse 106 to position cursor 306 at a location where only one object could be selected, that object would be highlighted by the system. Then if the user paused the mouse at that position, when the user clicked on the mouse button, the highlighted object would be selected for further manipulation by the user.

However, if more than one object could be selected at the current cursor location, a list symbol 310 appears on display screen 108 indicating that the user has the option of selecting one of the possible objects for manipulation. In FIG. 3B, list symbol 310 is shown as an ellipsis. However, it is clear that list symbol 310 could be any one of a number of symbols or characters, such as a small box or the letter "L" for example, that would indicate to the user that the next step is selecting one of the possible objects pointed to by cursor 306. When the user clicks the appropriate mouse button in response to the appearance of list symbol 310, the user is provided with a selection box showing all of the possible selections. FIG. 3C shows an example of a selection box 312 as it might appear on display screen 108. An individual cell 314 in selection box 312 corresponds to one of the objects located under the current position of cursor 306. The number of cells 314 in selection box 312 remains flexible so that there are at least as many cells as objects that could be selected from the cursor location. So, for example, if cursor 306 is located at the same position as shown in FIG. 3B, the selections include front surface 308 of the outer three-dimensional object 302, front surface 316 of inner three-dimensional object 304, bottom surface 318 of inner three-dimensional object 304 or rear surface 320 of outer three-dimensional object 302. In this case, selection box 312 would contain at least four cells 314.

In order to select one of these objects, the user would move mouse 106 to position cursor 306 within selection box 312. As cursor 306 is positioned over each individual cell 314, the object on display screen 108 that corresponds to a particular cell 314 will be highlighted to show the association between cell and object to the user. As shown in FIG. 3C, cursor 306 is positioned over the upper left cell in selection box 312, and the corresponding object, bottom surface 318 of inner three-dimensional object 304, is highlighted. In an alternative embodiment, if appropriate, an icon representing the object on display screen 108 that corresponds to a particular cell 314 might be displayed within the cell to show the association between cell and object to the user. The user may move the cursor 306 from cell to cell within selection box 312 to observe the correspondence between each cell 314 and each possible object that might be selected. In order to select one of the objects identified by selection box 312, the user would position cursor 306 over the corresponding cell 314 and input the selection to the computer system. In a preferred embodiment, where the cursor-controlling device is mouse 106, the user would click on the appropriate mouse button to select the highlighted object.

If the user were to decide not to select one of the objects at the current cursor location after all and wanted to continue from the point where the selection process began, the user would only need to move cursor 306 outside of a tolerance zone surrounding selection box 312 or select a cell 314 reserved for that purpose. When computer system 100 recognizes the position of cursor 306 outside of the selection box limits, the entire process is restarted, and the user can move cursor 306 to a new position on display screen 108 to select another object.

By using selection box 312 to select a desired object on display screen 108 of a computer system, computer system 100 eliminates the tedious process of cycling through and rejecting all of the possible objects presented for selection by default by the system. By giving the user more control at the outset of the selection process, allowing the user to preview and select a highlighted object, rather than forcing the user merely to respond to system prompts throughout the process, the time spent in selection of an object and the number of required user inputs to the computer system are minimized.

The above example involving objects in three-dimensional space on a graphic display also pertains to a different system environment, such as, for example, a three-dimensional virtual reality environment. Rather than using a mouse as a cursor-controlling device, the user might employ a glove or finger-pointing device to select overlapping or hidden objects that the user "sees" in the virtual three-dimensional space. The user would be given a listing all of the objects within the selection range of the cursor. Then, as in the above example, the user would input the selection of one of those overlapping objects to the computer system which would isolate the selected object for further manipulation by the user.

The intelligent object selection described above is equally applicable to a graphic display in a two-dimensional environment. Although a two-dimensional environment does not present as many problems of "hidden" objects as in a three-dimensional environment, the user may still have a number of possible object selections at a given cursor location due to overlapping objects or objects that are in close proximity to one another. In this case, computer system 100 again eliminates the tedious process of cycling through and rejecting possible selections before selecting the desired object by providing the user with a selection box that enables isolation of the particular object desired by the user at the outset of the selection process.

Figure 4B:
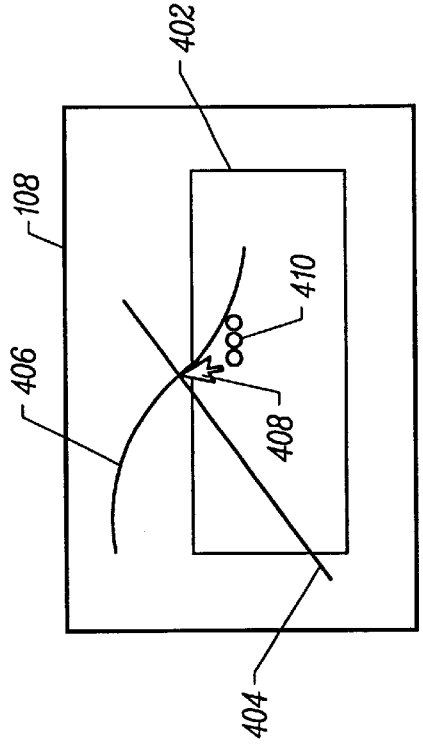
FIGS. 4A–4C show examples of selection of a desired object on a graphic display in a two-dimensional environment.
Figure 4C:
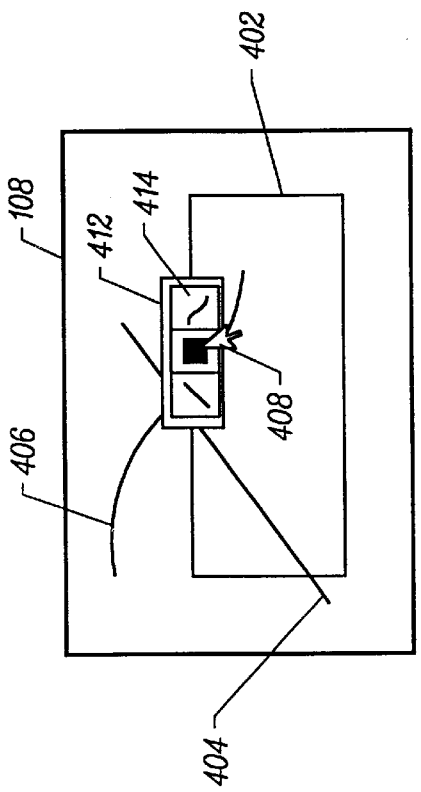
Figure 4A:
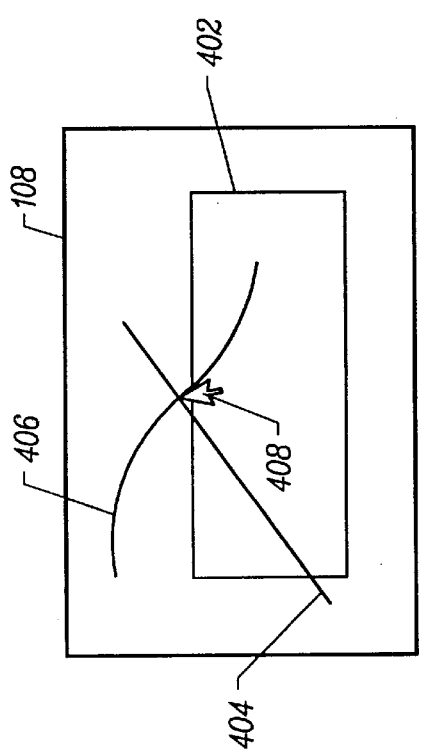

FIGS. 4A–4C show examples of selection of a desired object on a graphic display in a two-dimensional environment. Graphic display screen 108 displays a box 402 whose edges are intersected at various points by straight line 404 and curved line 406. The position of the cursor is again indicated by a cursor 408 having an arrow shape. Similar to the process described in conjunction with FIGS. 3A–3C, if the user wishes to isolate and select a particular surface or object for manipulation, the user begins the selection process by moving cursor 408 using the cursor-controlling means provided with the computer system 100, such as mouse 106 (FIG. 1A), and pausing above the desired object. Computer system 100 recognizes that a pause in cursor motion potentially indicates the need to make a selection of one of a number of objects. Again, if it happens that a pause in cursor motion does not indicate the need to make a selection of another object and that there is only one object that could be selected by the user at the current location of cursor 408, an input by the user to the system would automatically select that object. So, for example, if the user moved the mouse 106 to position cursor 408 at a location where only one object could be selected, that object would be highlighted by the system. Then if the user paused mouse 106 at that position, when the user clicked on the appropriate mouse button, the highlighted object would be selected for further manipulation by the user.

If more than one object could be selected at the cursor location, a list symbol 410 appears on display screen 108 indicating that the user has the option of selecting one of the possible objects for manipulation. In FIG. 4B, the list symbol 410 is again shown as an ellipsis. However, it should again be clear that list symbol 410 could be any one of a number of symbols or characters that would indicate to the user that the next step is selecting one of the possible objects pointed to by the cursor 408. When the user clicks the appropriate mouse button in response to the appearance of list symbol 410, the user is provided with a selection box showing all of the possible selections. FIG. 4C shows an example of a selection box 412 as it might appear on display screen 108. An individual cell 414 in selection box 412 corresponds to one of the objects located under the current position of cursor 408. The number of cells 414 in selection box 412 may remain flexible so that there are exactly as many cells as objects that could be selected from the cursor location. So, for example, if cursor 408 is located at the same position as shown in FIG. 4B, the selections include box 402, straight line 404 or curved line 406. In this case, selection box 412 would contain at least four cells 414.

In order to select one of these objects, the user would move the mouse to position cursor 408 within selection box 412. In a preferred embodiment, an icon representing the object on display screen 108 that corresponds to a particular cell 414 will be displayed within the cell to show the cell-object association to the user. Therefore, as shown in FIG. 4C, the left cell contains a straight line corresponding to line 404, the center cell contains a box corresponding to box 402, and the right cell contains a curve corresponding to curve 406. In an alternative embodiment, as cursor 408 is positioned over each individual cell 414, the object on display screen 108 that corresponds to a particular cell 414 could be highlighted to show the association between cell and object to the user, as described above in conjunction with FIG. 3C. In order to select one of the objects identified by selection box 412, the user would position cursor 408 over the corresponding cell 414 and input the selection to the computer system. In a preferred embodiment, where the cursor-controlling device is mouse 106, the user would click on the appropriate mouse button to select the desired object. As shown in FIG. 4C, the user may click on the center cell of selection box 412 to select box 402 for further manipulation.

Again, if the user were to decide not to select one of the objects at the current cursor location after all and wanted to continue with the application from the point where the selection process began, the user would only need to move cursor 408 outside of a tolerance zone surrounding selection box 412 or select a cell 414 reserved for that purpose. When computer system 100 recognizes the position of cursor 408 outside of the selection box limits, the entire process is restarted, and the user can move cursor 408 to a new position on the graphic display to select another object.

As in the case of a three-dimensional environment, by using selection box 412 to select a desired object on the two-dimensional graphic display of a computer system, computer system 100 eliminates the tedious process of cycling through and rejecting all of the possible objects presented for selection by default by the system. By giving the user more control at the outset of the selection process, allowing the user to preview and select an object, rather than forcing the user merely to respond to system prompts throughout the process, the time spent in selection of an object and the number of required user inputs to the computer system are minimized.

Figure 5:
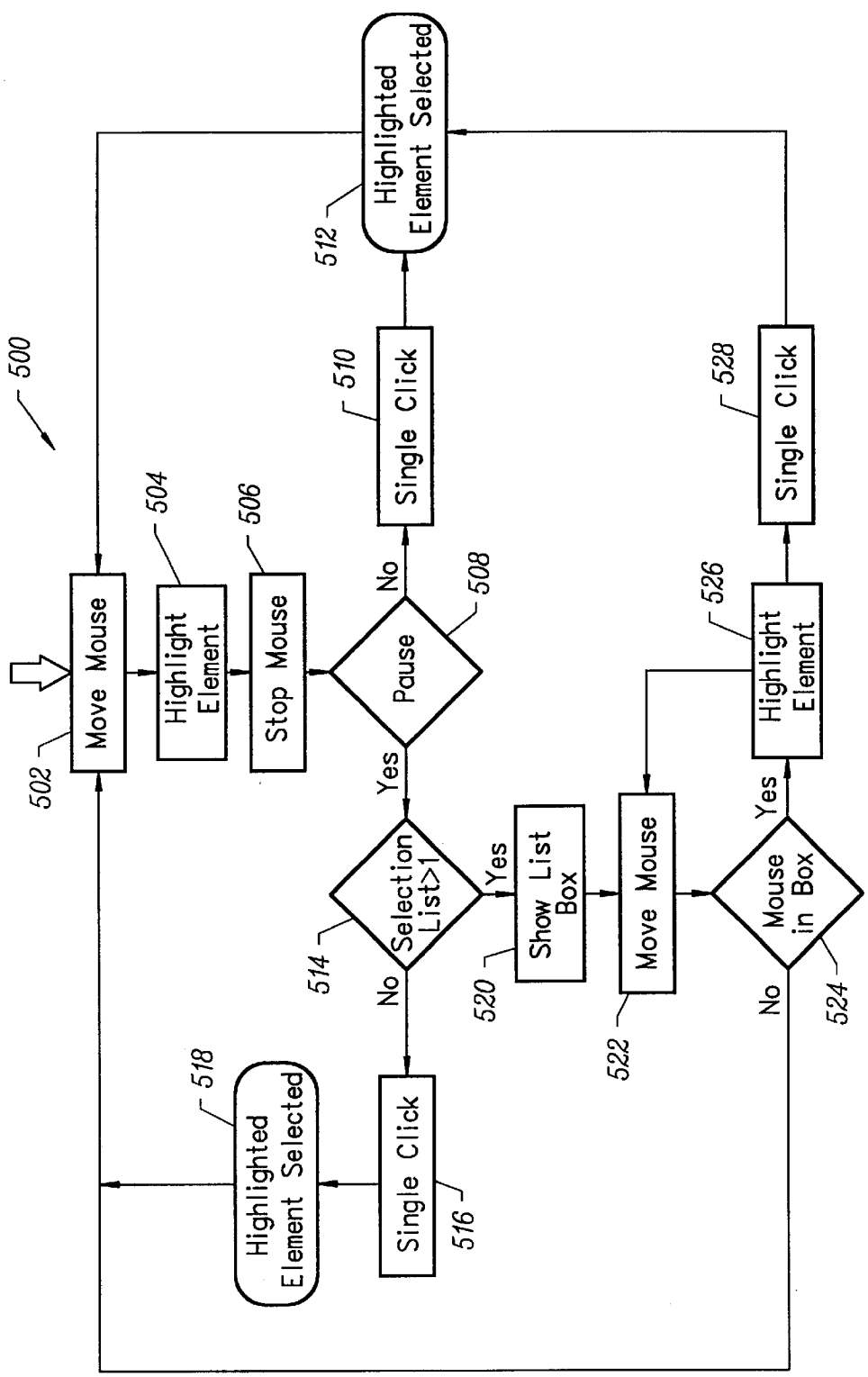
FIG. 5 shows a flow diagram of a process of a user attempting to select an object on a graphic display.

FIG. 5 shows a flow diagram of a process of a user attempting to select an object on a graphic display. Flow diagram 500 describes the selection process in an embodiment where the cursor-controlling means is mouse 106 (FIG. 1A) and a selected element is highlighted. It should be understood that the general process described in flow diagram 500 is applicable to alternative embodiments, such as, for example, an embodiment where an iconic representation of a selected element is placed in its corresponding cell in the selection box, as described in conjunction with FIG. 4C.

At step 502, the user moves the mouse to position the cursor at various locations across the graphic display screen. As the cursor passes over different objects or elements on the screen, the element pointed to by the cursor for default selection is highlighted at step 504. If the user wishes to select a particular object or element for further manipulation, the mouse is stopped at the appropriate position in step 506. The computer system then determines at step 508 whether the user has paused the mouse at its current location without providing any further input. If the element highlighted by the computer system is actually the one the user wishes to select, there is no need to pause the mouse to cause the selection box to appear, and the user clicks on the appropriate mouse button in step 510, causing the highlighted element to be selected in step 512. If the computer system does detect a pause in mouse activity, the subroutine proceeds to step 514, where the determination is made as to whether the cursor is pointing to more than one object at its current position.

If only one object could possibly be selected at the current cursor position, the user clicks on the appropriate mouse button in step 516, and the highlighted element is selected in step 518 for further user manipulation. If, however, a plurality of elements may be selected at the current cursor position, a list symbol appears on the display screen and a selection box is displayed in step 520. The user then moves the mouse at step 522 to position the cursor within the confines of the selection box to select one of the elements at the current cursor position. At step 524, the system determines whether the cursor is indeed located within the selection box. If it is not, then the subroutine returns to step 502, since the user has indicated a willingness to move to another location on the graphic display and select from another group of elements by removing the cursor from the selection box. But if the cursor is still within the box, the element corresponding to the cell pointed to by the cursor is highlighted in step 526. If the user does not wish to select that particular element, the mouse is moved to another cell in the selection box in step 522. The corresponding element is again highlighted in step 526. Once the user finds the desired element, the appropriate mouse button is clicked in step 528, and the corresponding element or object is selected in step 512 for further user manipulation.

In another embodiment of the present invention, the user is given the opportunity to select among several keypoints that are located in close proximity to one another at the cursor location. Keypoints are points of interest on an object, such as the center point of a circle or the endpoint of a line, and interesting points between objects, such as the intersection of two lines. When creating a new object, such as a line, it is often required to place it with respect to keypoints of existing objects. It should be noted that keypoints are not limited to two-dimensional objects. A keypoint could be the center point of a sphere or the corner of a box in three-dimensional space. The concept of keypoints can be further extended to include keylines and other objects. For example, a keyline could result from the intersection of two planer surfaces.

As with object selection, the selection of keypoints within graphics environments is tedious and error prone when several keypoints are located in the area to which the cursor points. In fact, it is often the case that keypoints exactly overlap, that is to say they are coincident. Which keypoint the user selects is of critical importance because relationships are based upon key-points and the elements to which they belong. Relationships are persistent behavioral rules which interrelate objects. The examples shown in FIGS. 6–8 serve to illustrate the concept of keypoints and relationships.

Figure 6C:
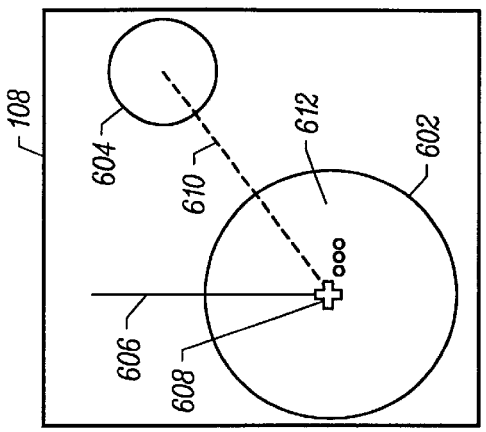
FIGS. 6A–6E illustrate the selection of a desired keypoint on a graphic display.
Figure 6B:
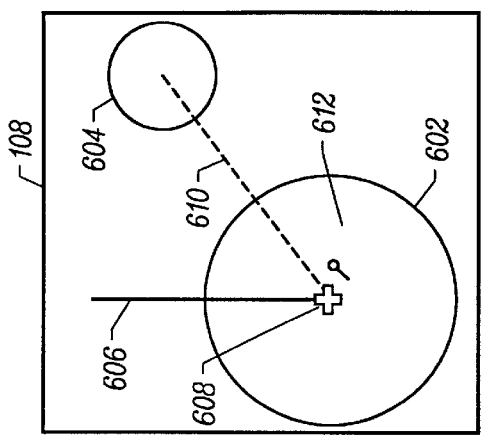
Figure 6E:
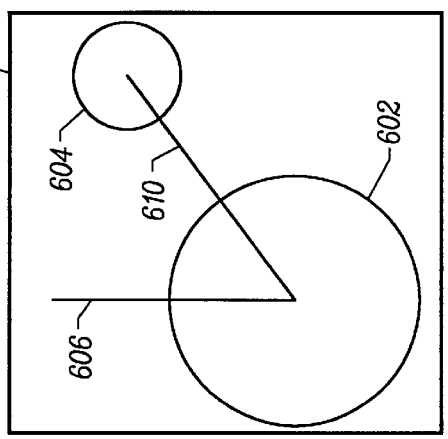
Figure 6A:
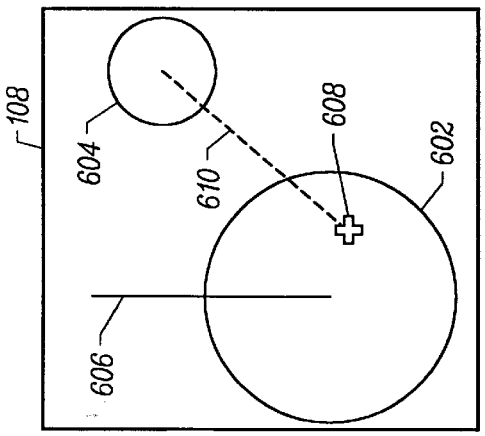
Figure 6D:
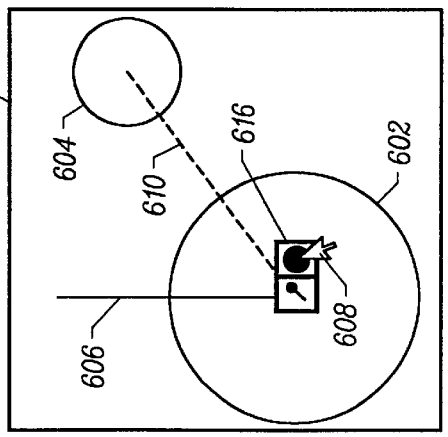

In FIG. 6A, graphic display screen 108 displays a circles 602 and 604, as well as a line 606 whose endpoint is coincident with the centerpoint of circle 602. The position of the cursor is indicated by a cursor 608 having a shape of a plus symbol. In FIG. 6A, the user is attempting to create a new line 610 between the centerpoint of circle 602 and the centerpoint of circle 604. In FIG. 6B, as the cursor 608 is moved to the centerpoint of circle 604, line 606 is highlighted. At the bottom right hand corner of cursor 608, an iconic representation 612 of the default keypoint is displayed, which is the endpoint of line 606 in this example. Assume that the user actually wishes to select the centerpoint of circle 602 as the keypoint that defines new line 610. When the user pauses cursor 608 an ellipsis 614 is displayed next to cursor 608, as shown in FIG. 5C, indicating that other keypoints have been found. A click on the appropriate button of mouse 106 signals computer system 100 to display a selection list shown as a selection box 616 in FIG. 5D. Selection box 616 shows all possible keypoint/relationship combinations using appropriate graphical representations.

As noted above, in an alternative embodiment, the cell in selection box 616 that identifies a keypoint/relationship combination could be highlighted. The user directly selects the desired keypoint/relationship combination by positioning cursor 608 over its graphical representation in selection box 616 and pressing the appropriate button of mouse 106.

Figure 7B:
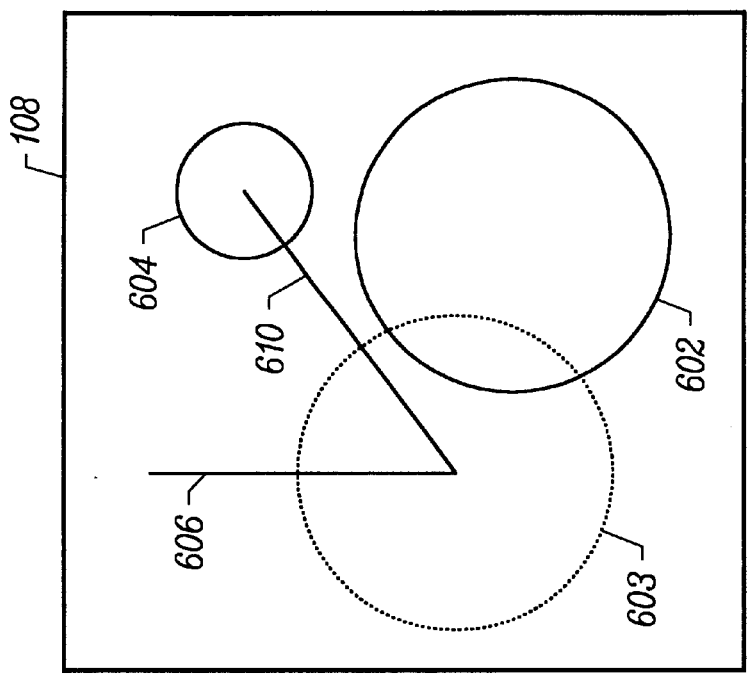
FIGS. 7A–7B illustrate the effect of the selection of a desired keypoint on a resulting relationship.
Figure 7A:
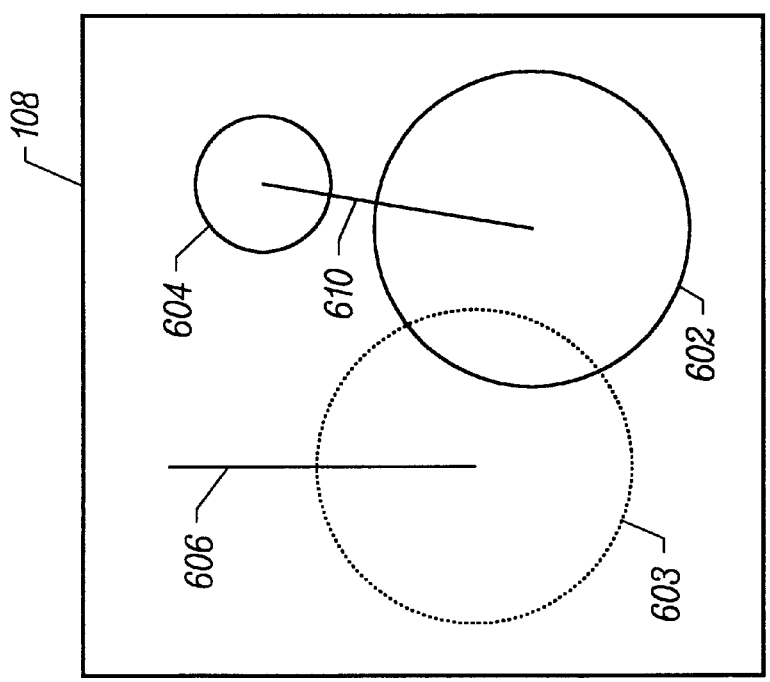
Figure 8C:
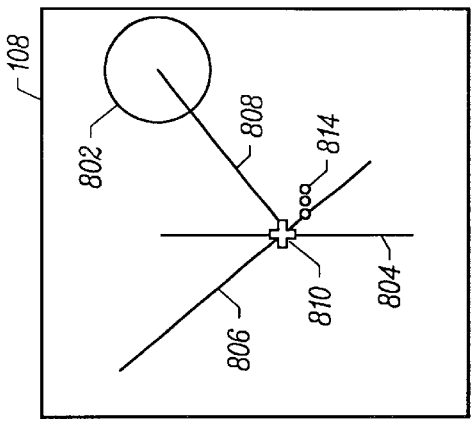
FIGS. 8A–8E illustrate the selection of a desired keypoint on a graphic display.
Figure 8B:
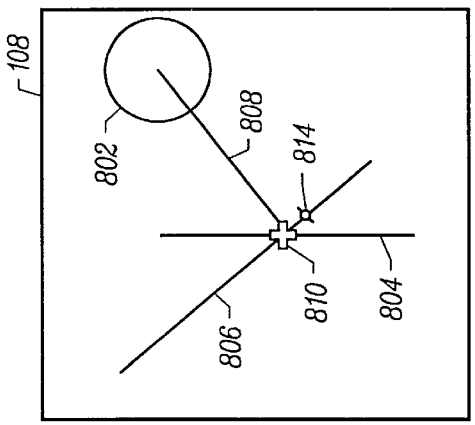
Figure 8E:
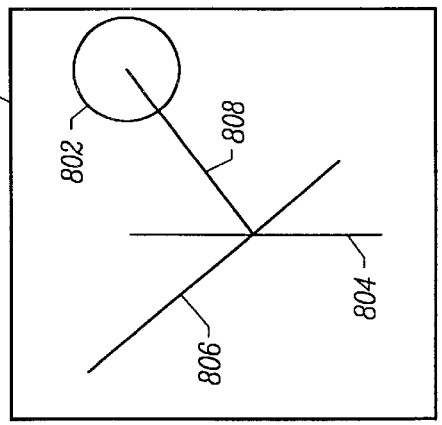
Figure 8A:
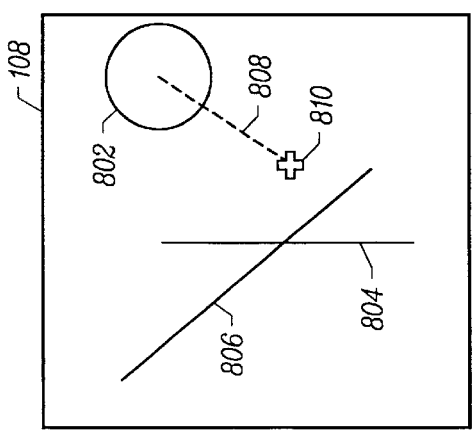
Figure 8D:
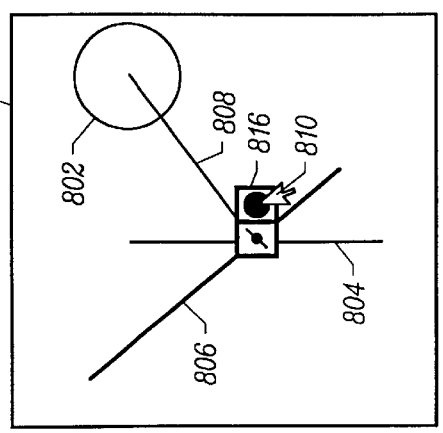

In the example shown in FIG. 6, the user could have reference the end of new line 610 to either the centerpoint of circle 602 or the endpoint of line 606. In both of these cases, the user would be selecting both a keypoint and a relationship. The relationship is that the endpoint of line 606 is coincident with the keypoint. FIG. 7 demonstrates the difference between the two selections. In FIG. 7A, the user moves circle 602 to a new location after new line 610 has been placed with reference to the centerpoint of circle 602. The old location of the circle is shown by broken line circle 603. New line 610 maintains its relationship with the centerpoint of circle 602, moving along with circle 602. However, as shown in FIG. 7B, if the user had chosen to place the endpoint of line 4 with reference to the endpoint of line 606, moving circle 602 would have no effect on new line 610, which would remain connected to line 604 that was coincident with the prior position of the centerpoint of broken line circle 603.

Another example is shown in FIG. 8, in which graphic display screen 108 displays a circle 802 in addition to lines 804 and 806. The midpoint of line 804 is close proximity to the intersection of line 804 and line 806. However, the two keypoints (mid-point of line 804 and intersection of lines 804 and 806) are only in close proximity and are not coincident with each other. Assume that in FIG. 8A, the user wishes to place a new line 808 from the center of circle 802 to the intersection of line 804 and line 806. The position of the cursor is indicated in the display by cursor symbol 810. In FIG. 8B, as the cursor 810 is moved to the desired keypoint, line 804 is highlighted. At the bottom right hand corner of cursor 810, an iconic representation 812 of the default keypoint is displayed, which is the midpoint of line 804 in this example. Assume that the user actually wishes to select the intersection of lines 804 and 806 as the keypoint that defines new line 808. When the user pauses cursor 810 an ellipsis 814 is displayed next to cursor 810, as shown in FIG. 8C, indicating that other keypoints have been found. A click on the appropriate button of mouse 106 signals computer system 100 to display a selection list shown as a selection box 816 in FIG. 8D. Selection box 816 shows all possible keypoint/relationship combinations using appropriate graphical representations. As noted above, in an alternative embodiment, the cell in selection box 816 that identifies a keypoint/relationship combination could be highlighted. The user directly selects the desired keypoint/relationship combination by positioning cursor 810 over its graphical representation in selection box 816 and pressing the appropriate button of mouse 106. FIG. 8E shows new line 808 connecting the centerpoint of circle 802 and intersection of lines 804 and 806.

The above description is illustrative and not restrictive. Many variations of the invention will become apparent to those of skill in the art upon review of this disclosure. For example, if a user were using an application offering the feature of text manipulation, it might be unclear if the cursor is pointing to a letter, a word or an entire sentence. In this case, the computer system of the present invention could present a selection box on the display screen from which the user would select the desired text.

The scope of the invention should, therefore, be determined not with reference to the above description, but instead should be determined with reference to the appended claims along with their full scope of equivalents.

What is claimed is:

1. In a computer system having a visual display for display of a plurality of objects, a method of resolving ambiguities in object association comprising:

receiving selection of a first location on the visual display with a cursor;

receiving selection of a second location on the visual display with the cursor;

identifying possible associations for an object with in-range objects thereby being in-range object associations, the in-range objects comprising objects from the plurality of objects that are within a selection range of the second location;

displaying a list of the in-range object associations on the visual display;

receiving selection of one of the in-range object associations from the list of the in-range object associations; and displaying the object on the visual display in response to the first location, the second location, and the selection of the one in-range object association, the object associated with one of the in-range objects.

2. The method of claim 1 wherein displaying the list of in-range object associations further comprises displaying a selection box on the visual display.

3. The method of claim 2 wherein displaying the selection box further comprises displaying a plurality of cells, each cell corresponding to one of the in-range object association.

4. The method of claim 3 wherein each cell also corresponds to one in-range object.

5. The method of claim 1 wherein the object comprises at least a first line.

6. The method of claim 5 wherein the one in-range object comprises a second line; and wherein a possible association comprises having a point of the second line also be an end point of the first line.

7. The method of claim 6 further comprising:

moving the point of the second line using the cursor on the visual display; and responsive thereto, moving the end point of the first line on the visual display.

8. A computer program product for a computer system having a processor and a display comprises:

code that directs the processor to receive a selection of a first location on the display with a cursor;

code that directs the processor to receive a selection of a second location on the display with a cursor;

code that directs the processor to determine possible associations for an object on the display with in-range objects, the in-range objects comprising objects that are within a selection range of the first location chosen from a plurality of objects, each possible association corresponding to at least one in-range object;

code that directs the processor to display a list of the possible associations on the display;

code that directs the processor to receive selection of one possible association from the list of the possible associations;

code that directs the processor to associate the object with at least one in-range object corresponding to the one possible association; and code that directs the processor to display the object on the display in response to selection of the first location and to the selection of the second location, wherein the codes reside on a tangible media.

9. The computer program product of claim 8 wherein the code that directs the processor to display the list of possible associations further comprises code that directs the processor to display an iconic representation for each possible association.

10. The computer program product of claim 9 wherein code that directs the processor to receive selection of the one possible association comprises code that directs the processor to receive selection of an iconic representation for the one possible association.

11. The computer program product of claim 10 wherein the object comprises at least a first line segment having a first end point and a second end point;

wherein the at least one in-range object comprises at least a second line segment; and wherein the one possible association comprises associating the first end point with a point on the second line segment.

12. The computer program product of claim 8 wherein the code that directs the processor to associate the object with at least one in-range object corresponding to the one possible association comprises code that directs the processor to associate the object with two in-range objects corresponding to the one possible association; and wherein the one possible association comprises associating the object with an intersection of the two in-range objects.

13. The computer program product of claim 12 wherein the object comprises an arc having end points; and wherein an end point of the arc is located at the intersection.

14. The computer program product of claim 8 wherein the object comprises at least a first line segment having a first end point and a second end point;

wherein the at least one in-range object comprises a circle; and wherein the one possible association comprises associating the first end point with a center point of the circle.

15. A computer system for resolving ambiguities in object association comprising:

a display configured to display an object and a set of objects, and configured to display a list of cells, each cell on the list of cells associated with at least one object from the set of objects; and a processor configured to receive a selection of a first location on the display with a cursor, configured to receive a selection of a second location on the display with the cursor, configured to determine possible associations for the object on the display with objects from the set of objects in response to the first location, configured to receive a selection of a cell from the list of cells, and configured to associate the object with at least one object corresponding to the cell.

16. The computer system of claim 15 wherein the one object comprises a first line; and wherein an association comprises locking a point on the first line to a point on the at least one object, the point on the at least one object associated with the first location on the display.

17. The computer system of claim 16 wherein the point on the first line is selected from the group: an end point, a midpoint between end points, a point between end points.

18. The computer system of claim 15 wherein an association comprises locking a point on the object to a geometric feature of the at least one object, the geometric feature of the at least one object associated with the first location on the display.

19. The computer system of claim 18 wherein the geometric feature of the at least one object is selected from the group: center point, center of curvature.

20. The computer system of claim 18 wherein the geometric feature of the at least one object comprises an intersection point with another object.

* * * * *